Patented June 1, 1943

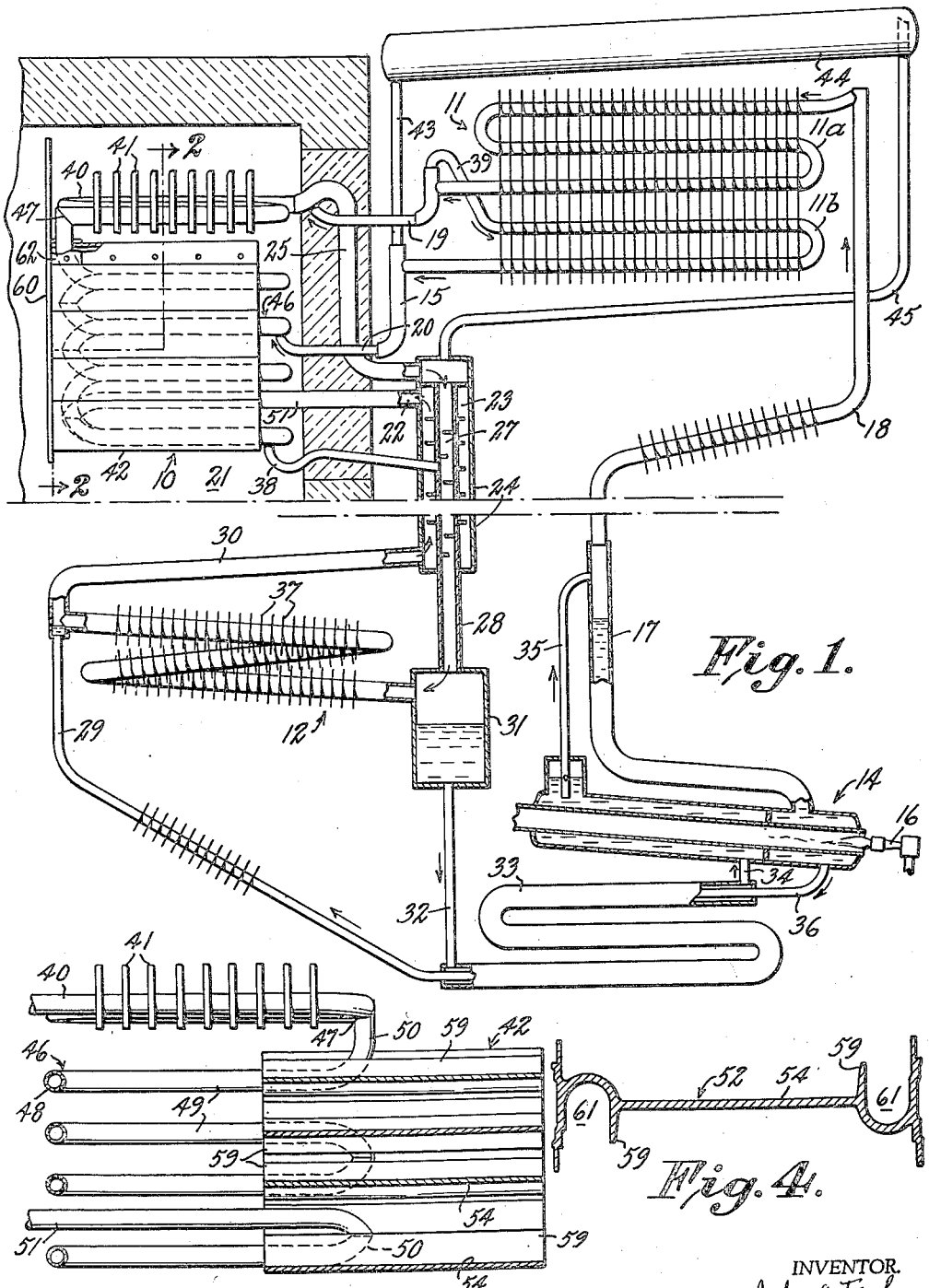

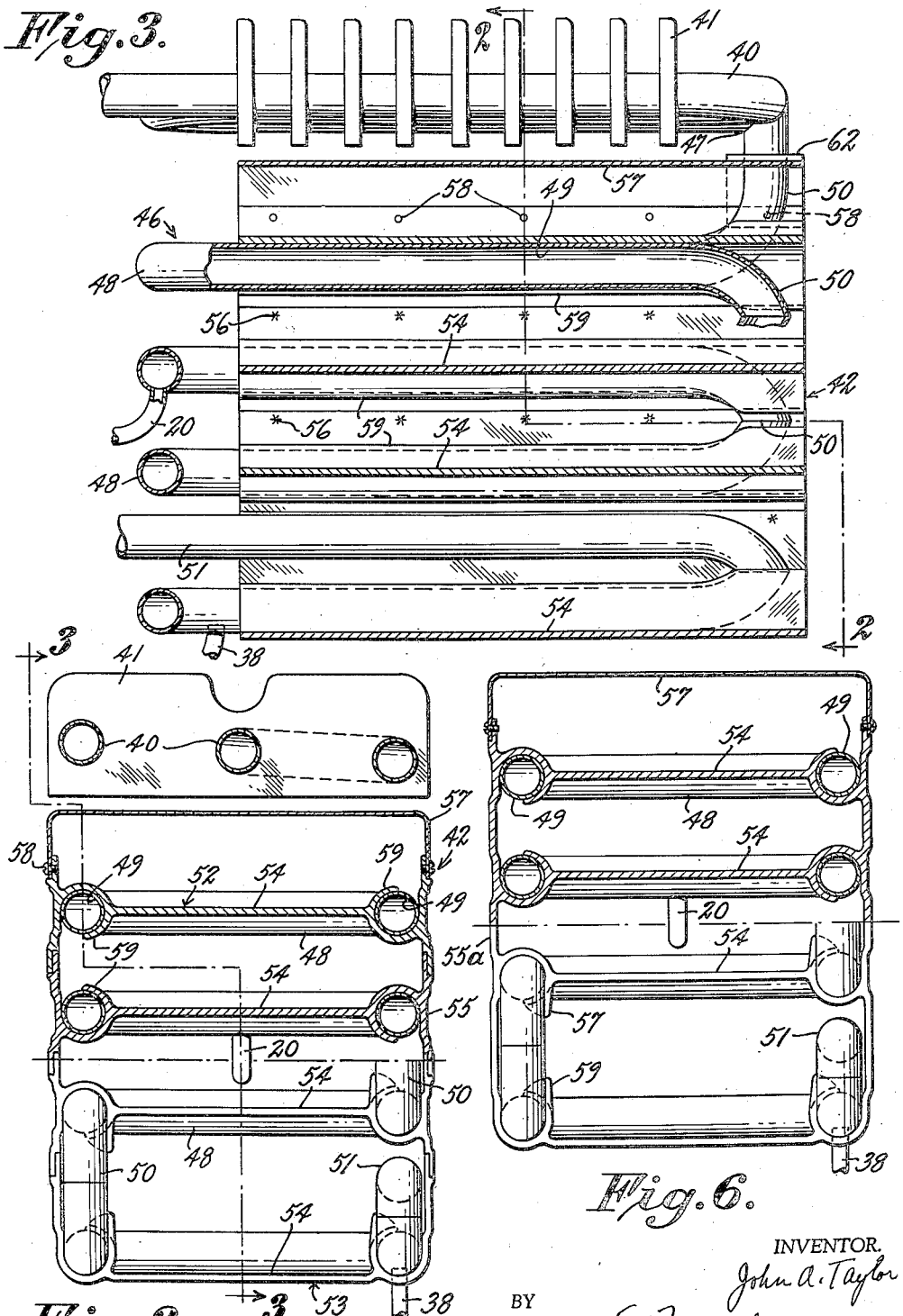

2,320,501

UNITED STATES PATENT OFFICE 2,320,501

REFRIGERATION

John A. Taylor, Evansville, Ind., assignor to Servel, Inc., New York, N. Y., a corporation of Delaware Application November 3, 1939, Serial No. 302,625

10 Claims. (Cl. 62—126)

My invention relates to refrigeration, and more particularly to evaporators or cooling units for refrigeration apparatus.

It is an object of the invention to provide an improved evaporator or cooling unit which is simple to build and in which all machining operations are avoided to permit assembly of the parts.

The above and other objects and advantages of the invention will become apparent from the following description taken in conjunction with the accompanying drawings, and of which:

Fig. 1 more or less diagrammatically illustrates refrigeration apparatus provided with a cooling unit or evaporator embodying the invention;

Fig. 2 is a front elevation, partly in section, taken on line 2—2 of Figs. 1 and 3;

Fig. 3 is a side vertical sectional view taken on line 3—3 of Fig. 2;

Fig. 4 is a sectional view of an intermediate section of the shell with which the looped coil is assembled to form the cooling unit shown in Figs. 1 to 3 inclusive;

Fig. 5 is a side elevation, partly in section, illustrating the manner in which the looped coil and shell of the cooling unit are assembled; and Fig. 6 is a front elevation, similar to Fig. 2 and partly in section, illustrating a modification of the invention.

Referring to Fig. 1, my improved cooling unit or evaporator 10 is shown in connection with refrigeration apparatus of a uniform pressure type containing a pressure equalizing agent. Refrigeration apparatus of this type includes the cooling unit 10, a condenser 11, an absorber 12, and a generator 14 which are interconnected in a manner well known in the art and which will briefly be described hereinafter. The apparatus or system contains a solution of refrigerant in absorption liquid, such as ammonia in water, for example. and also an auxiliary agent or inert gas, such as hydrogen.

The generator 14 is heated in any suitable manner, as by a gas burner 16, for example, whereby refrigerant vapor is expelled from solution in generator 14. The refrigerant vapor flows upward through a standpipe 17 and a conduit 18 into the condenser 11 in which it is liquefied. Liquid refrigerant flows from condenser 11 through conduits 19 and 20 into cooling unit 10 which is located in a thermally insulated storage space 21.

Refrigerant fluid in cooling unit 10 evaporates and diffuses into inert gas which enters at 22 from the outer passage 23 of gas heat exchanger 24. Due to evaporation of refrigerant fluid into inert gas in cooling unit 10, a refrigerating effect is produced with consequent absorption of heat from the surroundings. The rich gas mixture of refrigerant vapor and inert gas formed in cooling unit 10 flows from the upper end thereof through a conduit 25, the inner passage 27 of gas heat exchanger 24, and conduit 28 into the lower part of absorber 12.

In absorber 12 the rich gas mixture flows counter-current to downwardly flowing weak absorption liquid which enters through a conduit 29. The absorption liquid absorbs refrigerant vapor from the inert gas, and inert gas weak in refrigerant flows from absorber 12 through a conduit 30, outer passage 23 of gas heat exchanger 24, and enters the lower part of cooling unit 10 at 22.

The circulation of gas in the gas circuit just described is due to the difference in specific weight of the columns of rich and weak gas in the inner and outer passages 27 and 23, respectively, of gas heat exchanger 24. Since the rich gas is heavier than the weak gas, force is produced or developed for causing flow of rich gas toward absorber 12 and flow or weak gas toward cooling unit 10.

Absorption liquid enriched in refrigerant flows from the lower part of absorber 12 into a vessel 31, and thence through a conduit 32, outer passage of a liquid heat exchanger 33, and conduit 34 into generator 14. Liquid is raised in the generator 14 by thermosiphon tube 35 and flows back to the generator through standpipe 17. The refrigerant vapor expelled out of solution in generator 14, together with refrigerant vapor entering through thermosiphon tube 35, flows upwardly through standpipe 17 and conduit 18 into the condenser 11, as explained above.

The absorption liquid from which refrigerant has been expelled flows from generator 14 through a conduit 36, inner passage of liquid heat exchanger 33, and conduit 29 to the upper part of absorber 12. This circulation of absorption liquid results from the raising of liquid by thermosiphon tube 35.

The absorber 12 may be cooled in any suitable manner. As shown, the absorber is provided with cooling fins 37 whereby heat liberated with absorption of refrigerant vapor in absorber 12 is transferred to surrounding cooling air flowing over the surfaces of the absorber. A drain conduit 38 is provided at the lower end of cooling unit 10 to permit unevaporated refrigerant to flow into the inner passage 27 of gas heat exchanger 24.

The condenser 11 includes an upper section 11a and a lower section 11b. Refrigerant vapor entering upper condenser section 11a through conduit 18 is liquefied therein and flows through conduit 19 into the upper part of cooling unit 10. Refrigerant vapor not liquefied in upper condenser section 11a flows through conduit 39 into lower condenser section 11b in which it is liquefied. Liquid refrigerant formed in lower condenser section 11b flows through conduits 15 and 20 into an intermediate part of cooling unit 10.

The upper part of cooling unit 10 may be primarily employed for cooling the storage space 21, and, as shown in the several figures of the drawings, comprises a pipe in the form of an S-shaped loop 40 having a plurality of heat dissipating elements or fins 41 fixed thereto to provide a relatively extensive heat transfer surface. The lower part of cooling unit 10 including shell 42 is employed as a freezing unit since evaporation of liquid refrigerant takes place at a lower temperature therein.

The lower end of condenser 11 is connected by conduit 43, vessel 44, and conduit 45 to the gas circuit, as at the upper end of gas heat exchanger 24, for example, so that any inert gas which may pass through the condenser can flow into the gas circuit.

Refrigerant vapor not liquefied in condenser 11 flows through conduit 43 to displace inert gas in vessel 44 and force such gas through conduit 45 into the gas circuit. By forcing gas into the gas circuit in this manner, the total pressure in the system is raised whereby an adequate condensing pressure is obtained to insure condensation of refrigerant vapor in condenser 11.

In addition to the upper S-shaped loop 40 with fins 41 attached thereto, the cooling unit 10 includes the shell 42 and looped coil 46. The looped coil 46 is connected to the upper S-shaped loop 40 at 47 and includes a plurality of horizontally disposed U-shaped loops having the closed ends or bends 48 at the rear of the cooling unit 10. The parallel straight portions or sides 49 extend forward from bends 48 and the sides of the several loops are disposed one above the other. The forward ends of the horizontal loops are connected to one another and to the upper S-shaped loop 40 by vertical connecting bends 50 to provide a continuous downward path of flow for liquid refrigerant entering through conduits 19 and 20. With this arrangement the vertical connecting bends 50 are at alternate sides of the cooling unit 10, that is, the uppermost connecting bend 50 is at one side of cooling unit 10 and the connecting bend 50 beneath it is at the opposite side of the cooling unit.

The lowest horizontal loop is connected to a conduit section 51, as shown in Figs. 1, 3 and 5, which is disposed above the side or straight portion to which it is connected. Thus, at the lower part of the cooling unit, there is a front vertical bend at each side of cooling unit 10, as shown most clearly in Fig. 2. The looped coil 46 may be formed from a number of conduit sections connected together, as by welding, for example, the conduit sections being shaped in any suitable manner to provide the horizontal and vertical connecting bends 48 and 50, respectively.

As shown most clearly in Fig. 2, the shell 42 includes a plurality of H-shaped members 52 and a bottom U-shaped member 53. The horizontal portions of the H-shaped members 52 serve as the shelves 54 and the integrally formed vertical portions serve as portions of the side walls 55 of the shell 42. The bottom U-shaped member 53 provides the bottom shelf 54 and the lower portions of the spaced apart side walls 55. The members 52 and 53 are notched along their edges, as shown in Fig. 2, whereby these members interfit to provide more or less smooth exterior surfaces for the shell 42. The members 52 and 53 are secured together, as by welding, for example, as indicated at 56 in Fig. 3. The shell 42 also includes a top 57 having downwardly extending sides which may be secured by screws 58 to the uppermost H-shaped member 52. The sides or straight portions 49 of the horizontal loops are secured in position by ribs 59 formed integrally with the H-shaped members 52 and U-shaped member 53. The ribs 59 are bent about the straight portions 49 of the looped coil to provide good thermal contact between the looped coil and the outer portions of the shelf portions of the members 52 and 53.

As liquid refrigerant flows downwardly through the looped coil 46, evaporation and diffusion of refrigerant into inert gas takes place with consequent absorption of heat from its surroundings, as explained above. When trays containing water to be frozen are placed on the shelves 54, heat is removed from the bottoms of the trays through the shelves 54 which are in thermal relation with looped coil 46. A baffle plate 60 is mounted on the front of shell 42, as shown in Fig. 1. The baffle plate 60 may be provided with a door to permit the insertion and withdrawal of ice trays into and from the shell 42.

In fabricating the cooling unit 10, the looped coil 46 with upper S-shaped loop 40 may be formed as a separate unit, as shown in Fig. 5. The intermediate and bottom members 52 and 53 are formed with the ribs 59 extending vertically from the shelf portions 54. An intermediate H-shaped member 52 with the ribs 59 substantially parallel to the spaced vertical side portions is shown in Fig. 4. The intermediate and bottom members 52 and 53 are secured together by welding, as indicated at 56 in Fig. 3, to provide the shell 42 without the top 57.

To assemble the looped coil 46 and shell 42, these parts are placed in alignment with the rear of shell 42 adjacent to the front vertical connecting bends 50 of the looped coil. The shell 42 and looped coil 46 are then moved relatively to each other with the grooves or channels 61 formed by side wall portions and ribs 59 receiving the straight portions 49 of the horizontal loops.

The shell 42 and looped coil 46 are so constructed and arranged that these parts can be assembled without any interference by the horizontal and vertical bends 48 and 50 connecting the straight portions 49. With this arrangement no machining operations are required to permit assembly of the looped coil 46 and shell 42. To this end the two ribs 59 of each intermediate member 52 extend in opposite directions from the shelf portion 54, as shown in Fig. 4. When the H-shaped members 52 and bottom U-shaped member 53 are assembled and secured together, the ribs 59 of adjacent shelf portions 54 at one side of shell 42 extend toward each other and at the other side thereof extend away from each other. As shown in Fig. 2, the ribs 59 of the first and second shelves 54 at the left hand side of shell 42 extend toward each other. At the opposite side of the shell 42 the ribs 59 of the first and second shelves 54 extend away from each other. With respect to the second and third shelves 54, the ribs 59 at the left-hand side of shell 42 extend away from each other and the ribs 59 at the right-hand side of the shell extend toward each other. Only in the U-shaped bottom member 53 do the ribs 59 extend in the same direction from the shelf portion 54.

When the shell 42 and looped coil 46 are placed in alignment and moved relatively to each other, as explained above, the front vertical connecting bends 50 move into sides of the shell where the ribs 59 extend toward each other. In Fig. 5 the front ends of the horizontal loops are partly moved into the grooves or channels 61 of shell 42. In this position, referring to Fig. 2, one vertical connecting bend 50 is moving into the channels 61 formed by the ribs 59 of the first and second shelves 54 at the left-hand side of shell 42. The next lower vertical connecting bend 50 is at the opposite side of shell 42 and moving into the channels formed by the ribs 59 of the second and third shelves 54. The bottom vertical connecting bend 50 is at the left-hand side of shell 42 and moving into the channels formed by the ribs 59 of the third and bottom shelves 54.

After the shell 42 is moved rearwardly onto the looped coil 46 to the position shown in Fig. 3, the ribs 59 are bent about the straight portions 49 with a suitable tool, whereby the straight portions are clamped and rigidly held in position by the ribs 59, as shown in Figs. 2 and 3. Since the vertical connecting bends 50 can move into the channels 61 in the manner just described and the horizontal bends 48 are at the rear of shelf 42, it will be seen that the looped coil 46 and shell 42 can readily be assembled without the necessity of any machining operations.

The H-shaped members 52 and U-shaped bottom member 53 may be formed with the ribs 59 extending from the front to the rear of these members. Since the vertical bends 50 are at the front of the shell 42 after the looped coil and shell are assembled, the ribs 59 cannot be bent at the regions of the front vertical connecting bends 50. After the ribs 59 are bent along the straight portions 49, therefore, the ribs flare about rear of the connecting bends 50, as shown in Fig. 3, and at their extreme forward ends are parallel to the side walls 55. This is clearly seen in Fig. 2 which is a front elevation of the cooling unit with the upper portion thereof in section. These vertical portions of the ribs 59 may be pressed against the front connecting bends 50 to obtain additional contact between the looped coil 46 and shell 42.

After the shell 42 and looped coil 46 are assembled the top 57 is secured in position by the screws 58. The horizontal portion of top 57 at the forward edge thereof may be provided with a recess to receive the uppermost vertical bend 50 connecting the S-shaped loop 40 and first horizontally disposed U-shaped loop of looped coil 46. After the top 57 is secured in position, an inverted L-shaped corner insert can be secured in position by the screws 58 to cover the cut away portion, as shown in Fig. 3. The top portion of insert 62 may also be recessed at its rear edge so that it can be moved rearwardly to fit about the uppermost vertical connecting bend 50.

Since the shell 42 is moved rearwardly onto the looped coil 46, the conduits 20 and 38 may be connected to the rear of the looped coil at the time the latter is formed. After the fabrication of the cooling unit 10 is completed, it is connected to other parts of the refrigeration apparatus by connecting the S-shaped loop 40 at 63 to conduit 25, connecting the conduits 51 and 38 to gas heat exchanger 24, and connecting conduit 20 to conduit 15.

The fabrication of cooling unit 10 in the manner described above lends itself to the use of H-shaped members 52 and a U-shaped member 53 which may be formed by extrusion. Figs. 1 to 5 inclusive illustrate a cooling unit which has been built and in which the looped coil 46 is formed of steel and the members 52 and 53 are formed of aluminum. The members 52 and 53 may be formed of any suitable metal, the metal preferably possessing good thermal conductive properties. When the members 52 and 53 are formed by extruding aluminum through suitable dies, the ribs 59 are formed in the manner shown in Fig. 4.

Fig. 6 is a view similar to Fig. 2 illustrating an embodiment of the invention in which the side walls 55 and shelves 54 are formed as an integral one piece unit instead of a plurality of separate members later secured together. The top 57 may be secured by screws 58 to the upper edges of the side walls, as in the embodiment described above. The manner in which the shell 42 and looped coil in Fig. 6 are assembled is the same as described in the embodiment illustrated in Figs. 1 to 5 inclusive and further description of the present embodiment will not needlessly be repeated here.

While several embodiments of the invention have been shown and described, such variations and modifications are contemplated as fall within the true spirit and scope of the invention, as pointed out in the following claims.

What is claimed is:

1. A cooling unit comprising a shell providing a freezing enclosure, said shell having side walls and shelves disposed between said side walls, the major portion of each of said shelves providing a smooth supporting surface, a formation integral with and extending along the sides of said shelves from the front end to the rear end of the shell, certain of said formations being united to form one of said side walls and said remaining formations being united to form said other side wall, each of said formations comprising a pair of ribs of which one is curved upwardly from the shelf carrying such formation and the other of which is curved downwardly therefrom, one of each of said pair of ribs being shaped to provide a portion of one of said side walls, said formations being arranged to provide channels extending along said side walls and disposed one above another, a looped coil having horizontal U-shaped loops disposed one above the other with horizontal bends connecting the spaced apart arms of said loops at one end of said shell and vertical bends at the other end of said shell each connecting a leg of one of said horizontally disposed loops to the corresponding leg of the loop adjacent thereto, the straight portions of said loops being disposed in said channels along said side walls.

2. A cooling unit or evaporator comprising a shell providing a freezing enclosure, said shell having side walls and horizontally disposed parts extending between said side walls, the major portion of each of said parts providing a smooth supporting surface usable as a shelf, ribs formed integrally with said horizontally disposed parts, the extreme edges of said ribs being vertically offset with respect to the smooth surface portions of said horizontally disposed parts, said ribs and portions of said parts adjacent to said side walls being shaped to provide grooves or channels extending from the front to the rear of said shell at regions within said side walls, a looped coil including U-shaped loops having spaced apart straight portions or arms disposed one above another, horizontal bends connecting the spaced arms of each loop at one end of said shell, vertical bends at the other end of said shell connecting the vertically spaced arms of two loops disposed one above the other, said channels being formed with spaced apart sides embracing the straight portions of said loops, each of said ribs, serving as one of said spaced apart sides, being bent about said straight portions.

3. A cooling unit or evaporator comprising a shell providing a freezing enclosure, said shell having spaced apart side walls and horizontally disposed parts extending between said side walls, the major portion of each of said parts providing a smooth supporting surface usable as a shelf, ribs formed integrally with said horizontally disposed parts, the extreme edges of said ribs being vertically offset with respect to the smooth surface portions of said horizontally disposed parts, the extreme edges of some of said ribs being disposed above and others below the smooth surface portions of said horizontally disposed parts, said ribs and portions of said horizontally disposed parts being shaped to provide grooves or channels extending from the front to the rear of said shell, a looped coil having straight portions, said channels being formed with spaced apart sides adapted to embrace the straight portions of said loops, each of said ribs, serving as one of said spaced apart sides, being bent about said straight portions.

4. A cooling unit or evaporator comprising a shell providing a freezing enclosure, said shell having spaced apart side walls and horizontally disposed parts extending between said side walls, the major portion of each of said parts providing a smooth supporting surface usable as a shelf, ribs formed integrally with said horizontally disposed parts, the extreme edges of said ribs being vertically offset with respect to the smooth surface portions of said horizontally disposed parts, the extreme edges of some of said ribs being disposed above and others below the portions of the smooth surface portions of said horizontally disposed parts, said ribs and portions of said horizontally disposed parts being shaped to provide grooves or channels extending from the front to the rear of said shell, and a looped coil having straight portions, the regions at which said ribs join said horizontally disposed parts being spaced from said side walls substantially the diameter of the straight portions of said looped coil, said channels being formed with spaced apart sides embracing the straight portions of said loops, each of said ribs, serving as one of said spaced apart sides, being bent about said straight portions and extending toward one of said side walls.

5. A cooling unit or evaporator including a shell and a looped coil; said looped coil including a plurality of loops, each having spaced apart straight portions or arms, disposed one above another; horizontal bends at the rear of the unit connecting the spaced apart arms of each loop; vertical bends at the front of the unit connecting the vertically spaced arms of adjacent loops disposed one above the other; said shell including spaced apart side walls, horizontally disposed shelf walls joining said side walls, and ribs extending from the front to the rear thereof; said shell including said ribs being constructed and arranged to form grooves or channels extending from the front to the rear of the unit; said channels being formed with spaced apart sides to receive the straight portions of said loops; and said looped coil being formed and said channels being located so that said shell and coil can be placed end to end and in alignment with the rear of said shell adjacent to said front vertical connecting bends and said shell and said coil moved toward each other, whereby said channels will always receive said straight portions during such relative movement without interference by the connecting bends.

6. A cooling unit or evaporator comprising a shell providing a freezing enclosure, said shell comprising a plurality of wall parts including spaced apart vertical walls and horizontally disposed shelf walls joining said vertical walls, ribs formed integrally with said shelf walls at regions adjacent to and spaced from said vertical walls, each of said ribs cooperating with wall parts of said shell to form a channel or groove extending from the front to the rear of said shell, the extreme edges of some ribs associated with adjacent shelf walls and disposed one above the other being located in the space between adjacent shelf walls, and the extreme edges of other ribs associated with adjacent shelf walls and disposed one above the other being located outside the space between adjacent shelf walls, a looped coil having straight portions, said channels being formed with spaced apart sides embracing the straight portions of said loops, each of said ribs, serving as one of said spaced apart sides, being bent about said straight portions.

7. A cooling unit or evaporator including a shell and a looped coil; said looped coil including a plurality of loops, each having spaced apart straight portions or arms, disposed one above another; horizontal bends at the rear of the unit connecting the spaced apart arms of each loop, and vertical bends at the front of the unit connecting the vertically spaced arms of adjacent loops disposed one above another; said shell comprising a plurality of wall parts including spaced apart vertical walls and horizontally disposed shelf walls joining said vertical walls; ribs formed integrally with said shelf walls at regions adjacent to and spaced from said vertical walls; each of said ribs cooperating with wall parts of said shell to form a channel or groove extending from the front to the rear of said shell; the extreme edges of one group of ribs associated with adjacent shelf walls and one above the other being located in the space between said adjacent shelf walls and the extreme edges of another group of ribs associated with adjacent shelf walls and one above the other being located outside the space between adjacent shelf walls; and said looped coil being formed and said channels being located so that said shell and coil can be placed end to end and in alignment with the vertically connecting bends of said coil adjacent to one end of said shell and said shell and said coil moved toward each other, whereby said channels formed by said wall parts and said one group of ribs receive the vertical connecting bends of said coil during such relative movement and permit said channels to receive the straight portions of said loops without interference by the connecting bends.

8. An element for a cooling unit including spaced apart sides serving as portions of the side walls of the unit, a horizontal connecting part located intermediate the ends of the spaced apart sides and having a smooth surface portion usable as a shelf, said horizontal connecting part being formed integrally with said spaced apart sides, and two ribs formed integrally with said connecting part at regions adjacent to and spaced from said sides, the extreme edge of one of said ribs adjacent to one of said sides being disposed above the smooth surface portion of said connecting part, and the extreme edge of said other rib adjacent to said other side being disposed below the smooth surface portion of said connecting part.

9. Structure for a cooling unit or evaporator including spaced apart sides serving as side walls of the unit, a plurality of spaced horizontal parts connecting said sides, each of said horizontal parts having smooth supporting surfaces usable as a shelf, and ribs formed integrally with said connecting parts, said ribs joining said connecting parts at regions spaced from and adjacent to said sides, the extreme edges of one group of said ribs associated with adjacent horizontal connecting parts and disposed one above the other being located in the space between adjacent horizontal connecting parts, and the extreme edges of another group of said ribs associated with adjacent horizontal connecting parts and disposed one above the other being located outside the space between adjacent horizontal connecting parts.

10. A cooling unit or evaporator including a shell providing a freezing enclosure, said shell comprising a plurality of wall parts including spaced apart side walls and a horizontally disposed wall joining said side walls at regions intermediate the top and bottom ends of said side walls, said horizontally disposed wall having ribs extending therefrom and cooperating with said wall parts to form channels extending in the direction of said side walls, and a looped coil including straight portions, said channels being formed with spaced apart sides embracing the straight portions of said looped coil, each of said ribs, serving as one of said spaced apart sides, being bent about said straight portions.

JOHN A. TAYLOR.